US005146799A

United States Patent [19]

Sato et al.

[11] Patent Number: 5,146,799

[45] Date of Patent: Sep. 15, 1992

[54] ACTUATOR IN POWER ANTENNA DEVICE

[75] Inventors: Masaei Sato, Nitta; Yukiteru Hosoya, Sawa, both of Japan

[73] Assignee: Mitsuba Electric Manufacturing Co., Ltd., Gunma, Japan

[21] Appl. No.: 727,468

[22] Filed: Jul. 9, 1991

[30] Foreign Application Priority Data

Jul. 9, 1990 [JP] Japan .................. 2-072872[U]
Jul. 9, 1990 [JP] Japan .................. 2-072873[U]

[51] Int. Cl.$^5$ .................. F16H 19/02; F16H 1/16; H01Q 1/10

[52] U.S. Cl. .................. 74/89.14; 74/89.21; 74/425; 343/903

[58] Field of Search .................. 74/89.14, 89.21, 425; 343/903

[56] References Cited

U.S. PATENT DOCUMENTS 2,365,886 12/1944 Lehmann .................. 343/903
4,665,406 5/1987 Takizawa et al. .................. 343/903
4,866,458 9/1989 Kimura .................. 343/903
5,019,834 5/1991 Suga .................. 343/903 X

*Primary Examiner*—Allan D. Herrmann

*Attorney, Agent, or Firm*—Oliff & Berridge

[57] ABSTRACT

As the first aspect of the invention, an actuator in a power antenna device includes a worm provided on a shaft of the motor; a first gear unit integrally including a worm wheel and a small intermediate gear; a second gear unit integrally including a large internal gear and a part of a clutch device; reduction gears including first reducing gears (a pair of the worm gear and the worm wheel) and second reducing gears (a pair of the small intermediate gear and the large internal gear); and a support board made of a hard material such as metal and integrally fixed to a casing for the actuator, and which rotatably supports the first and second gear units on the side where the small intermediate gear and the large internal gear engage. As the second aspect of the invention, the actuator comprises: a cord case for housing a drive cord; first reducing gears placed close to one side of the cord case and inside an imaginary cylinder defined by the extended outer periphery of the cord case; a clutch device arranged in an opposite side of the cord case and inside the internal periphery of the cord case; and second reducing gears arranged inside the internal periphery of the cord case.

4 Claims, 3 Drawing Sheets

PRIOR ART FIG. 6

ACTUATOR IN POWER ANTENNA DEVICE

BACKGROUND OF THE INVENTION

1. Field of the Invention

The present invention relates to an actuator for a power antenna device of a motor vehicle, such as an automobile.

2. Description of the Related Art.

Power antennas which automatically extend and contract by drive motors are installed in many automobiles such as passenger cars. This kind of device requires speed reducer means to reduce the rotational speed. Referring to FIGS. 5 and 6, speed reducer means in a related actuator comprises: first reduction gears wherein the torque is transmitted from a worm 13 provided on the motor shaft to a worm wheel 14; and second speed reduction gears wherein the torque is transmitted from a pinion gear 15 through an idle gear 16 to a drive gear 17.

The related speed reducer means results in a rather complicated structure and requires many elements due to the three stages of gear engagement as described above. Also, the related speed reducer means is not suited for a resin casing which has lately been tested to obtain a lighter body. Ordinary resins are difficult to shape with high precision though the mounting precision of the gears is largely dependent on the molding precision of the resins. Ordinary resins have, as their properties, low strength and a tendency to plastically deform. Consequently, when gears are mounted on resin casing, the portions supporting the axles of the gears are deformed by the radial reaction force of torque transmitted by gear engagement. As a result, the interval of the axles will become wider and smooth gear-engagement will be affected. This phenomena becomes worse on a gear engagement at a larger stage in transmission. Special kinds of resin, such as engineering plastic, will supply the necessary accuracy and strength, but these special kinds of resins require special molding processes and thus increase the cost substantially.

The speed reducer means in the related actuator takes up a large space since the three stages of gear engagement result in a complicated structure with many elements that have to be arranged. A part of the speed reducer means inevitably is placed outside the space occupied by the cord case, which makes the casing large. For a lighter and compact body, this problem has to be solved.

SUMMARY OF THE INVENTION

This invention is to provide an actuator for a power antenna device in which the above-described problems are solved.

As the first aspect of the invention, an actuator in a power antenna device able to extend and contract an antenna rod by a drive motor, comprises: a worm gear on an output shaft (axle) of the drive motor; a first gear unit integrally including a worm wheel and an intermediate gear, the worm wheel engaging the worm; a second gear unit integrally including an internal gear and a torque input portion, the internal gear engaging the intermediate gear; a drive gear driven by the torque input portion of the second gear unit; clutch means located between the torque input portion of the second gear unit and the drive gear for disconnecting transmission of torque from the drive motor to the drive gear when the drive gear is overloaded; a cord case for housing a drive cord for extension and retraction of the antenna rod, the drive gear engaging the drive cord; speed reducer means for reducing rotational speed of the drive shaft of the drive motor, including first reduction gears in which torque is transmitted from the worm to the worm wheel and second reduction gears in which torque is transmitted from the intermediate gear to the internal gear; and a rigid support board for rotatably supporting the first and second gear units on a side of the support board on which the intermediate gear and the internal gear engage.

As the second aspect of the invention, an actuator device in a power antenna able to extend and contract by a drive motor, comprises: an actuator in a power antenna device for extension and contraction of an antenna rod by a drive motor comprising: a worm on an output shaft (axle) of the drive motor; a first gear unit integrally including a worm wheel and an intermediate gear, the worm wheel engaging the worm, a plane being defined in the first gear unit that separates the worm wheel from the intermediate gear; a second gear unit integrally including an internal gear and a torque input portion, the internal gear engaging the intermediate gear; a drive gear driven by the torque input portion of the second gear unit; clutch means located between the torque input portion of the second gear unit and the drive gear for disconnecting transmission of torque from the drive motor to the drive gear when the drive gear is overloaded; a cord case for housing a drive cord for extension and retraction of the antenna rod, the drive gear engaging the drive cord; speed reducer means for reducing rotational speed of the drive shaft of the drive motor, including first reduction gears in which torque is transmitted from the worm to the worm wheel and second reduction gears in which torque is transmitted from the intermediate gear to the internal gear; and wherein an outer periphery of the cord case defines a cylindrical area with first and second side portions of the cylindrical area located on opposite sides of the plane defined by the first gear unit, the first reduction gears being located within the cylindrical area in the first side portion, and the second reduction gears clutch means and drive gear being located within the cylindrical area in the second side portion.

In an actuator designed in accordance with the first aspect, the torque of the motor is transmitted through the first reduction gears (the worm to the worm wheel) to the second reduction gears (the intermediate gear to the internal gear) and then to the drive gear. The drive gear drives in and out the drive cord and thus the antenna. These reduction gears are composed of the worm and the first and second gear units: the first unit includes the worm wheel and the intermediate gear; the second unit includes the internal gear, and such speed reducer means do not require an idle gear as in prior actuators. Thus, the number of the parts is reduced.

The support board is a hard element made of e.g. metal, supporting the first and second gear units at the side of the intermediate gear and of the internal gear respectively, both at the side of the second reduction gears. Such support board enables a precise process to be employed for defining the support holes and provides firm support for the axles at the engaging side of the two gear units. Thus, this invention eliminates the possibility that the support holes are deformed and the interval of the axles is widened by the reaction force of transmitted torque, and therefore secures the smooth engagement of gears.

What the casing practically has to bear are the load through the support board and the load from the first reduction gears. The former load can be safely borne by the casing provided that the support board is mounted on the casing with enough rigidity to withstand such a load. The latter load is small since the first stage inherently produces only a small reaction force, particularly when it is of a worm type and since the axle of the worm wheel is supported at its one end by the support board. Consequently, the total load imposed on the casing is reduced so as to be borne by the casing made of an ordinary resin.

The actuator of the second aspect of this invention is designed to be compact. The first reduction gears are placed close to one side of the cord case but still do not require room beyond the outer periphery of the cylindrical area defined by the cord case. The second reduction gears are placed inside the inner periphery of the cord case and between the first reduction gears and the clutch means. Thus, the two-step reduction gears and clutch means assembled in the actuator of the invention do not require space beyond the cord case as in a related structure, thus providing a compact casing.

BRIEF DESCRIPTION OF THE DRAWINGS

The drawings illustrate a preferred embodiment of an actuator device for antenna of the present invention, wherein:

FIG. 6 a sectional plan view of the related actuator device shown in FIG. 5.

DETAILED DESCRIPTION OF THE PREFERRED EMBODIMENTS

Figure 1:
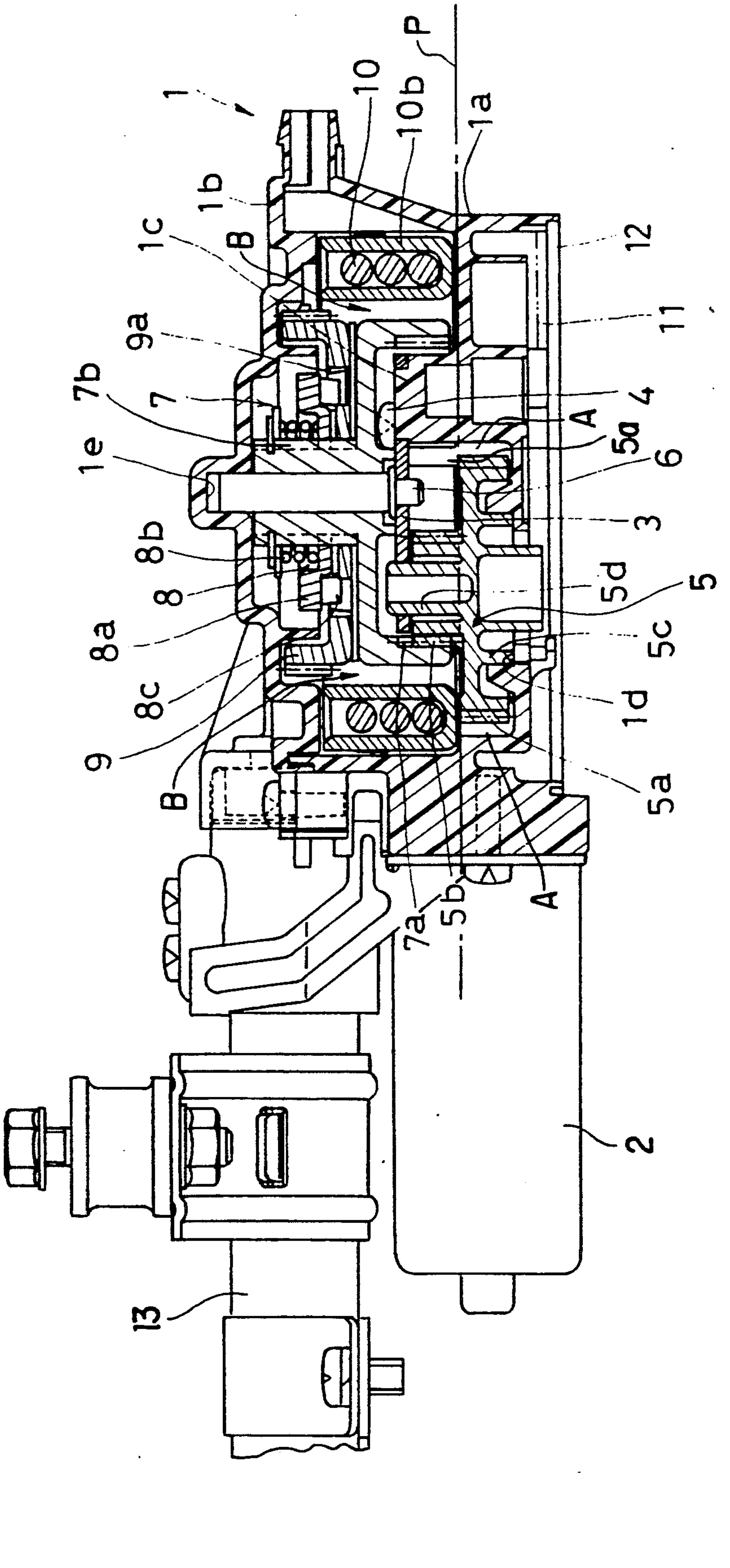
FIG. 1 is a sectional view of an embodiment of this invention.
Figure 2:
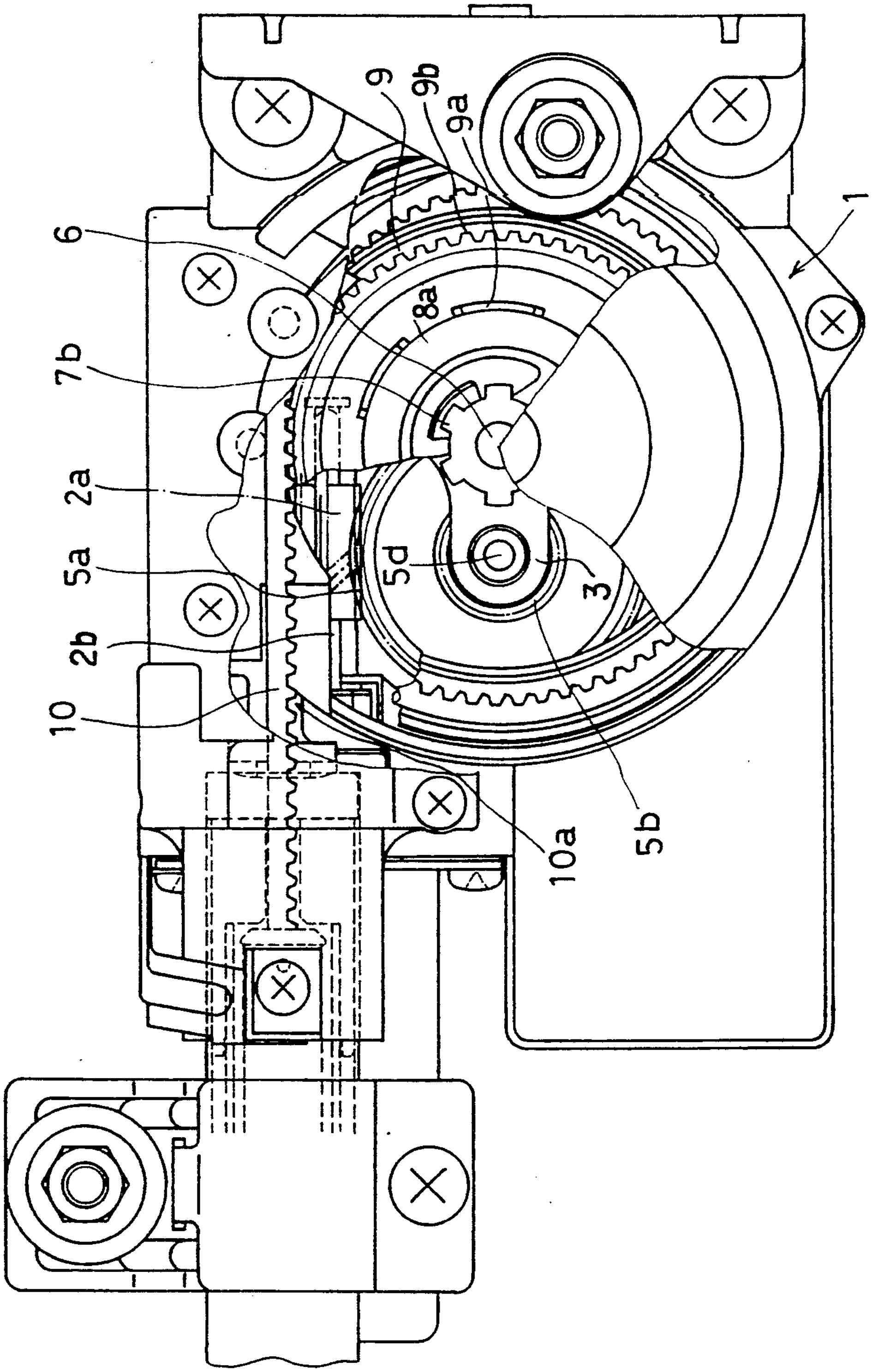
FIG. 2 is a sectional plan view of the embodiment shown in FIG. 1.
Figure 3:
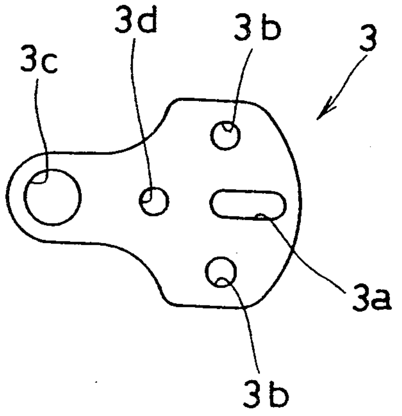
FIG. 3 is a plan view of a bearing board in this invention.
Figure 4:
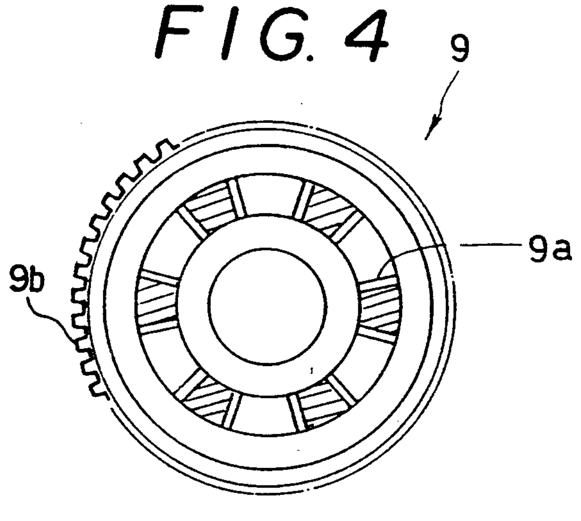
FIG. 4 is a plan view of a drive gear in this invention.
Figure 5:
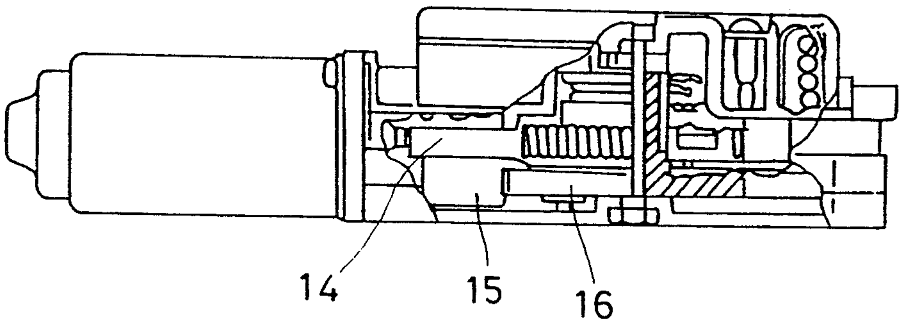
FIG. 5 PRIOR ART
FIG. 5 is a sectional view of a related actuator device.
Figure 5:
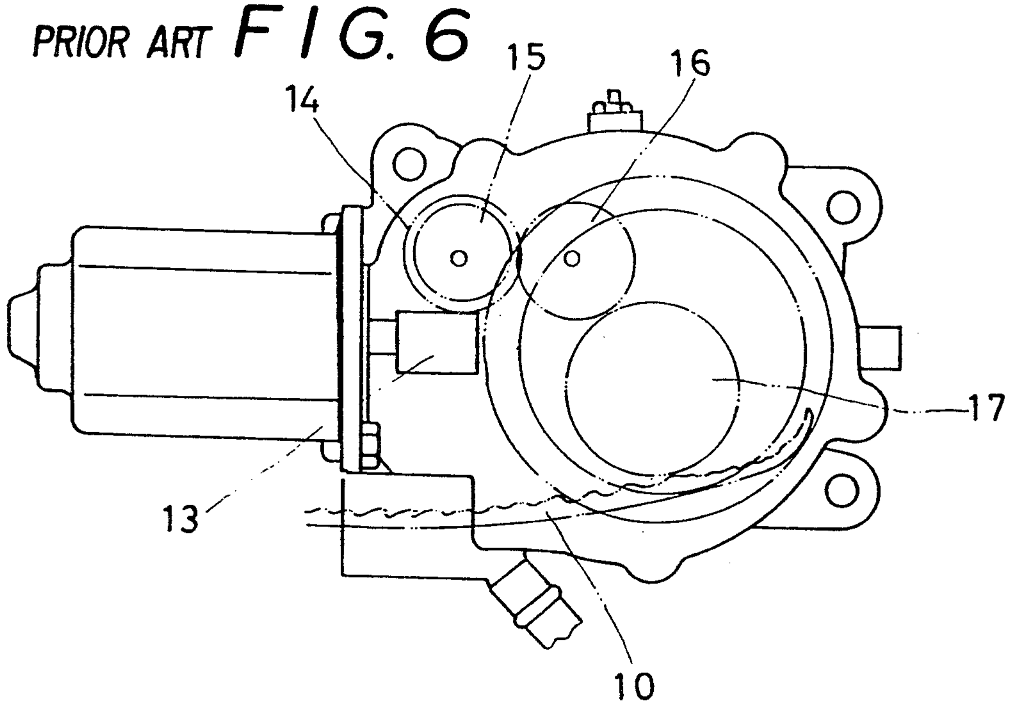
FIG. 5 PRIOR ART

A preferred but not-exclusive embodiment of the present invention will be described with reference to the drawings. Casing 1 of an actuator device of the invention is composed of a case body 1*a* and a case cover 1*b* facing each other. A worm gear 2*a* provided on the axle of a motor 2 is defined inside the case cover 1*b*. A support board 3 made of metal has a defining hole 3*a* (FIG. 3), screw holes 3*b* and a bearing hole 3*c*. The defining hole 3*a* is on a defining projection 1*c* shaped on the case body 1*a*, and the support board 3 is integrally fixed to the case body 1*a* by screws 4 through the screw holes 3*b*. The first gear unit 5 integrally includes a worm wheel 5*a* and an intermediate gear 5*b*, smaller than the worm wheel 5*a*. As shown in FIG. 1, the worm wheel 5*a* and an axle 5*c* protrude downwards, and, on the other side, the intermediate gear 5*b* and another axle 5*d* protrude upwards. The axle 5*c* is rotatably fitted in and supported by a boss sleeve 1*d* defined on the case body 1*a* whereas, on the side of the intermediate gear 5*b*, the axle 5*d* is rotatably supported by the bearing hole 3*c* bored through the support board 3. The engaged worm 2*a* and worm wheel 5*a* constitute the first reduction gears.

An axle 6 made of metal is, at one end, rigidly fitted in and fixedly supported by a support hole 3*d* bored through the support board 3 and, at another end, supported by a support channel 1*e* shaped on the case cover 1*b*. The axle 6 rotatably supports the second gear unit 7 integrally including an internal gear 7*a*. The internal gear 7*a* and the intermediate gear 5*b*, smaller than the internal gear 7*a*, engage each other and constitute the second reduction gears. A drive gear 9 is connected to the second gear unit 7 by means of a clutch means 8 so as to be capable of rotating independently from the second gear unit 7. A clutch plate 8*a* of the clutch means 8 is designed to engage and rotate integrally with splines 7*b* shaped on the sleeve portion of the second gear unit 7. The torque is transmitted from the clutch plate 8*a* to the drive gear 9 as follows. The clutch plate 8*a* is pushed against the drive gear 9 by a clutch spring 8*b*, and clutch pawls 8*c* protruding from the clutch plate 8*a* engage with clutch holes 9*a* defined in the drive gear 9. The clutch means 8 is designed to disconnect the torque transmission when the drive gear 9 is overloaded. The clutch plate 8*a* is forced to move against the push of the clutch spring 8*b*, and the clutch pawls 8*c* disengage from the clutch holes 9*a*.

A drive cord 10 is provided with a rack for engaging with the teeth 9*b* of drive gear 9, and one end of the drive cord is connected to the antenna rod 13. For extending and contracting the antenna rod 13, the drive gear 9 drives the drive cord 10 out of and into, according to the rotations of the drive gear 9, the cord case 10*b* housed in the case body 1*a*.Referring to FIG. 1, the outer periphery of the cord case 10*b* defines a cylindrical area which is separated into two opposing side portions A, B by a plane P (denoted by dotted lines) through the first gear unit 5 that divides the worm wheel 5*a* from the intermediate gear 5*b*. The first reduction gears, the combination of the worm 2*a* and the worm wheel 5*a*, are placed in the first side portion A of the cylindrical area defined by cord case 10*b* and designed compact enough to fit inside the circular boundary of the outer periphery of the cord case 10*b*. The drive gear 9 and the clutch means 8, including the clutch plate 8*a*, which releasably engage with the drive gear 9 so as to be able to disengage when the driver gear 9 is overloaded, are also designed to be placed within the inner periphery of the cord case 10*b* and in the second side portion B of the cylindrical area defined by cord case 10*b*. The second reduction gears, the combination of the small intermediate gear 5*b* integrally formed with the worm wheel 5*a* and the large internal gear 7*a* containing the intermediate gear 5*b*, are again designed to be placed within the inner periphery of the cylindrical area defined by cord case 10*b* and between the first reduction gears and the clutch means.

Reference No. 11 is a mount board for control means for torque control of the motor, and No. 12 is a cover for the mount board 11.

In the embodiment designed as above, the torque of the motor is transmitted through the first reduction gears, the worm 2*a* to the worm wheel 5*a*, to the second reduction gears, the small intermediate gear 5*b* to the large internal gear 7*a*, and then to the drive gear 9. The drive gear 9 drives in and out the drive cord 10 and thus the antenna. These reduction gears are composed of the worm 2*a*, the first and second gear units 5 and 7, the first unit including the worm wheel 5*a* and the smaller, intermediate gear; the second unit including the internal gear 7*a*, and such speed reducing means do not require an idle gear as in a related structure. Thus, the number of the parts is reduced.

The support board 3 is a hard or rigid element made of metal, supporting the first and second gear units 5 and 7 respectively, at the side of the intermediate gear 5*b* and the internal gear 7*a* respectively, both at the side of the second reduction gears. Such support board enables a precise process for defining the support holes and provides firm support for the axles 5*d* and 6 at the engaging side of the two gear units. Thus, this invention eliminates the possibility that the support holes are deformed and the interval of the axles will be widened by a reaction force of transmitted torque, thereby securing the smooth engagement of the gears.

What the casing practically has to bear is the load through the support board and the load from the first reduction gears. The former load can be safely borne by the casing provided that the support board is mounted on the casing with enough rigidity to withstand such a load. The latter load is small since the first stage inherently produces only a small reaction force, particularly when it is of worm type and since the axle of the worm wheel is supported at its one end by the support board. Consequently, the total load imposed on the casing is reduced so as to be borne by the casing made of an ordinary resin.

The actuator of this invention is designed to be compact. The first reduction gears are placed in the first side portion of the cord case 10*b* but still do not require room beyond the outer periphery of the cord case 10*b*. The second reduction gears are placed inside the inner periphery of the cord case 10*b* and between the first reduction gears and the clutch means. Thus, these two-step reduction gears and clutch means assembled in the actuator of the invention do not require space beyond the cord case as in a related structure, thus enabling a compact casing.

What is claimed is:

1. An actuator in a power antenna device for extension and retraction of an antenna rod by a drive motor comprising:

a worm on an axle of the drive motor;

a first gear unit integrally including a worm wheel and an intermediate, the worm wheel engaging the worm gear;

a second gear unit integrally including an internal gear and a torque input portion, the internal gear engaging the intermediate gear;

a drive gear driven by the torque input portion of the second gear unit;

clutch means located between the torque input portion of the second gear unit and the drive gear for disconnecting transmission of torque from the drive motor to the drive gear when the drive gear is overloaded;

a cord case for housing a drive cord for extension and retraction of the antenna rod, the drive gear engaging the drive cord;

speed reducer means for reducing rotational speed of the axle of the drive motor, including first reduction gears in which torque is transmitted from the worm to the worm wheel and second reduction gears in which torque is transmitted from the intermediate gear to the internal gear; and a rigid support board for rotatably supporting the first and second gear units on a side of the support board on which the intermediate gear and the internal gear engage.

2. The actuator of claim 1, further comprising a casing for enclosing the worm, first and second gear units, drive gear, clutch means, cord case and rigid support board, the rigid support board being fixed to the casing, and the casing being a plastic material and the support board being a metal material.

3. An actuator in a power antenna device for extension and retraction of an antenna rod by a drive motor comprising:

a worm on an axle of the drive motor;

a first gear unit integrally including a worm wheel and an intermediate gear, the worm wheel engaging the worm, a plane being defined in the first gear unit that separates the worm wheel from the intermediate gear;

a second gear unit integrally including an internal gear and a torque input portion, the internal gear engaging the intermediate gear;

a drive gear driven by the torque input portion of the second gear unit;

clutch means located between the torque input portion of the second gear unit and the drive gear for disconnecting transmission of torque from the drive motor to the drive gear when the drive gear is overloaded;

a cord case for housing a drive cord for extension and retraction of the antenna rod, the drive gear engaging the drive cord;

speed reducer means for reducing rotational speed of the axle of the drive motor, including first reduction gears in which torque is transmitted from the worm to the worm wheel and second reduction gears in which torque is transmitted from the intermediate gear to the internal gear; and wherein an outer periphery of the cord case defines a cylindrical area with first and second side portions on opposite sides of the plane defined by the first gear unit, and wherein the first reduction gears are located within the cylindrical area on the first side portion of the cylindrical area and the second reduction gears, clutch means and drive gear are located within the cylindrical area on the second side portion of the cylindrical area to define a compact actuator in which both the speed reducer means and clutch means are located within the cylindrical area of the cord case.

4. The actuator of claim 3, wherein the second reduction gears are located between the first reduction gears and the clutch means.

* * * * *